June 24, 1958  G. PETERSON  2,840,695
MEANS FOR TRANSDUCING ELASTIC WAVES
Filed Feb. 20, 1950  8 Sheets-Sheet 1

INVENTOR.
Glen Peterson

June 24, 1958         G. PETERSON         2,840,695

MEANS FOR TRANSDUCING ELASTIC WAVES

Filed Feb. 20, 1950         8 Sheets-Sheet 2

INVENTOR.
Glen Peterson

June 24, 1958　　　　　G. PETERSON　　　　　2,840,695
MEANS FOR TRANSDUCING ELASTIC WAVES
Filed Feb. 20, 1950　　　　　　　　　　　　　　　8 Sheets-Sheet 3
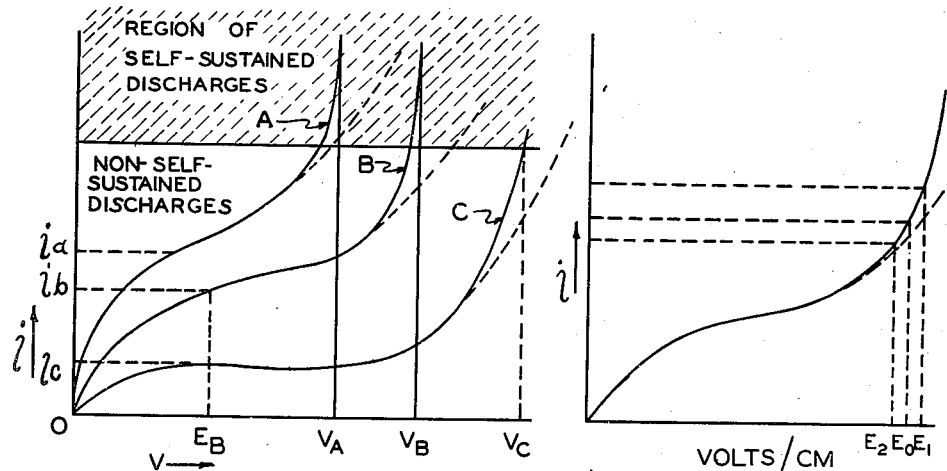
*Fig.*11
*Fig.*12
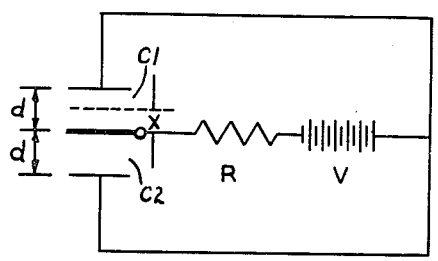
*Fig.*13
*Fig.*14
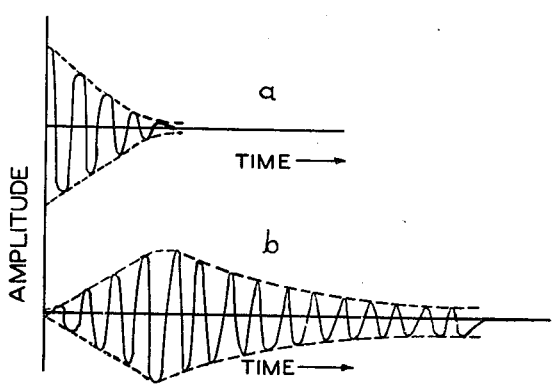
*Fig.*15
INVENTOR.
Glen Peterson June 24, 1958          G. PETERSON          2,840,695
MEANS FOR TRANSDUCING ELASTIC WAVES
Filed Feb. 20, 1950          8 Sheets-Sheet 4
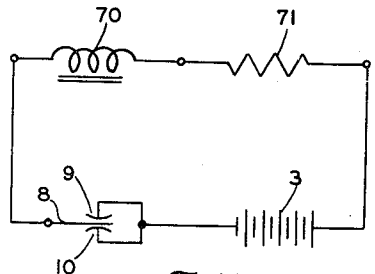
Fig. 16
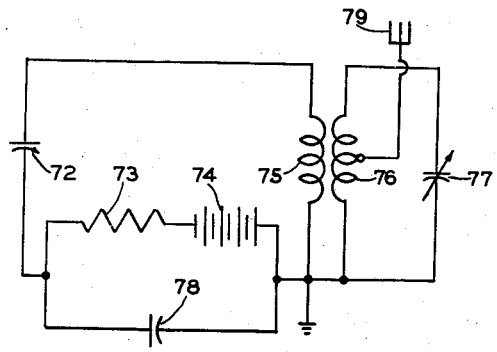
Fig. 17
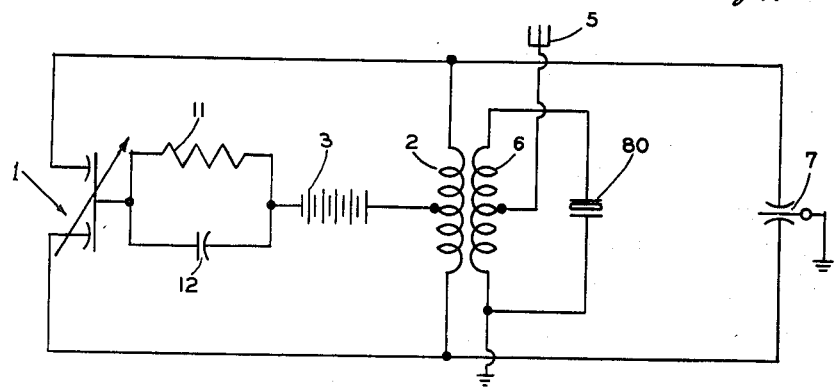
Fig. 18
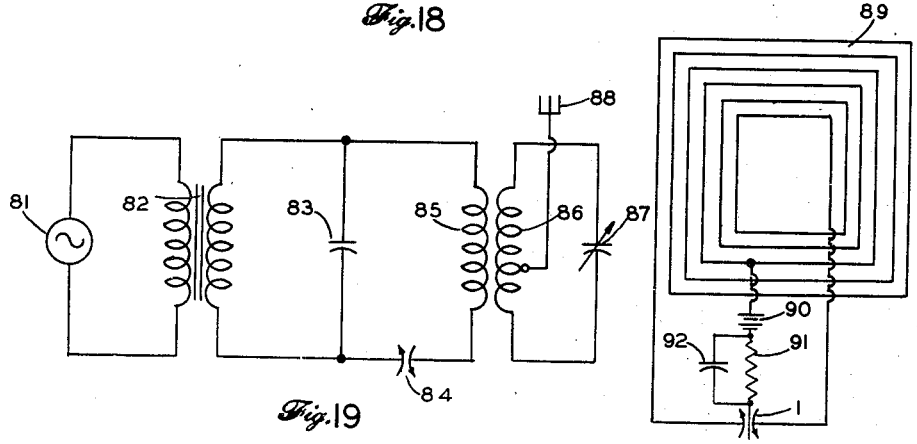
Fig. 19
Fig. 20
INVENTOR.
Glen Peterson INVENTOR.
Glen Peterson

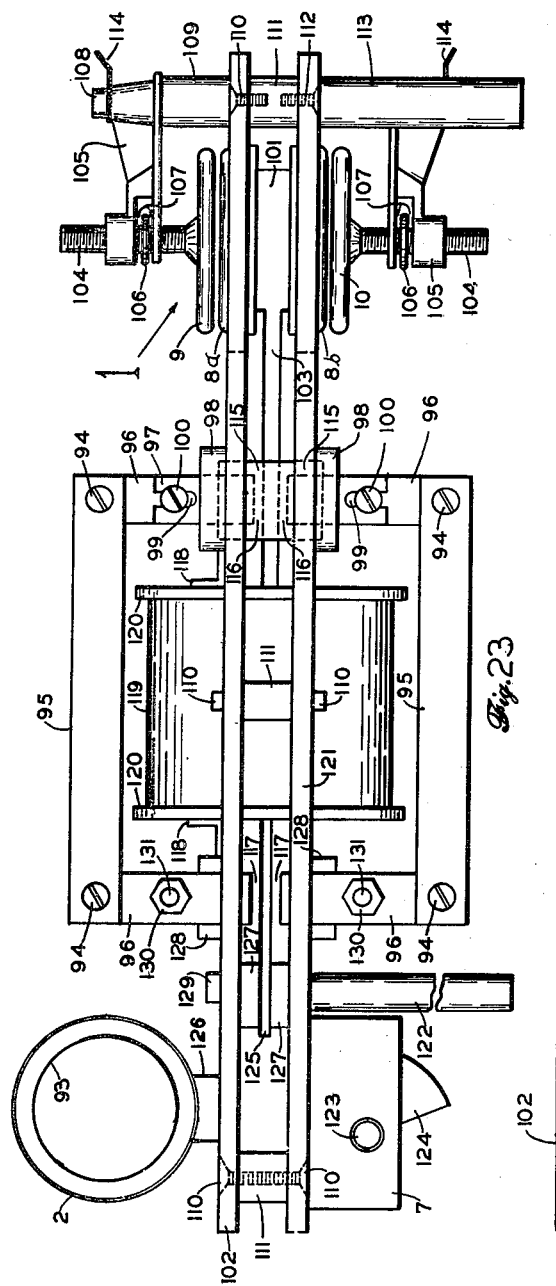
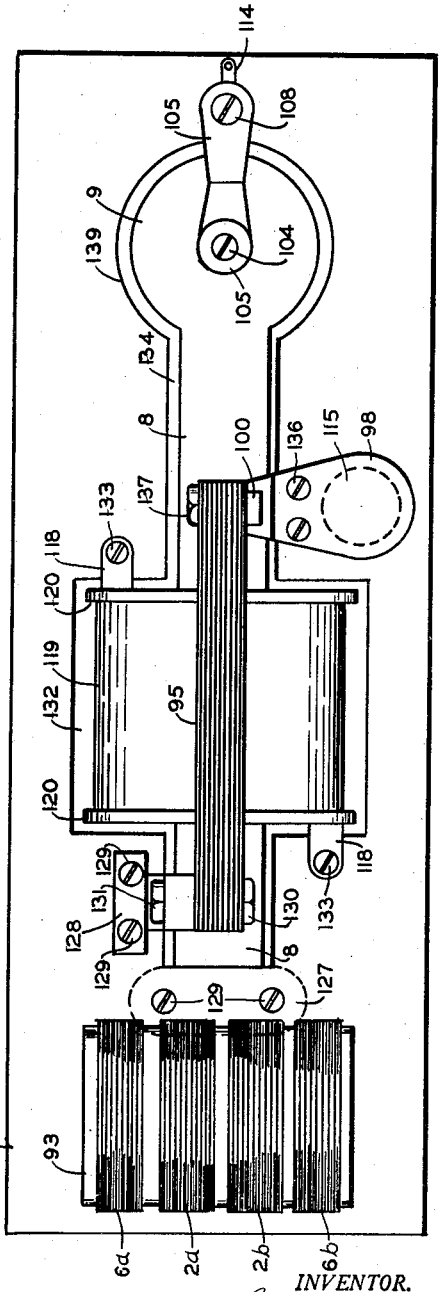

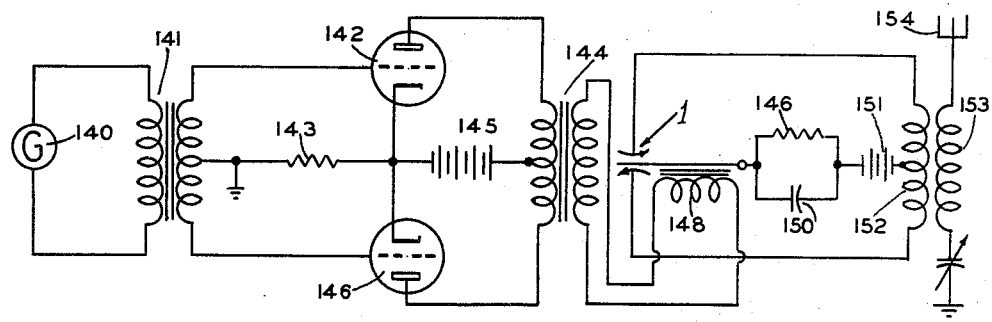
*Fig.* 25
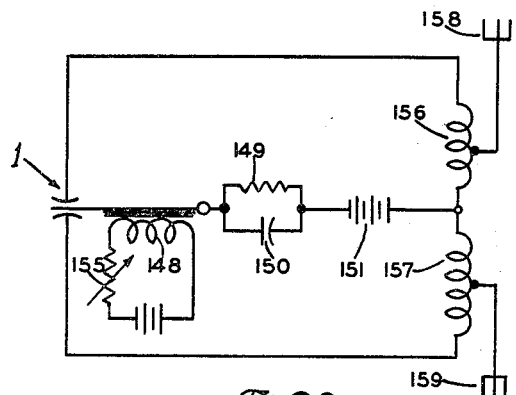
*Fig.* 26
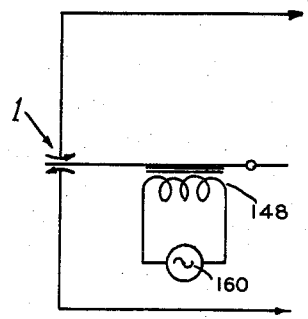
*Fig.* 27
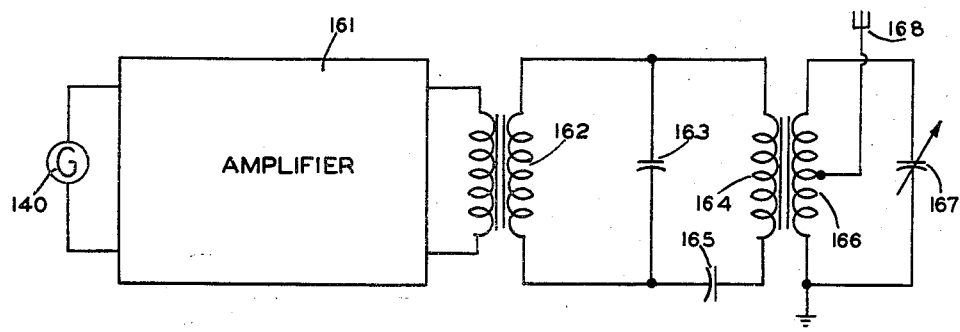
*Fig.* 28
INVENTOR.
Glen Peterson June 24, 1958  G. PETERSON  2,840,695
MEANS FOR TRANSDUCING ELASTIC WAVES
Filed Feb. 20, 1950  8 Sheets-Sheet 8
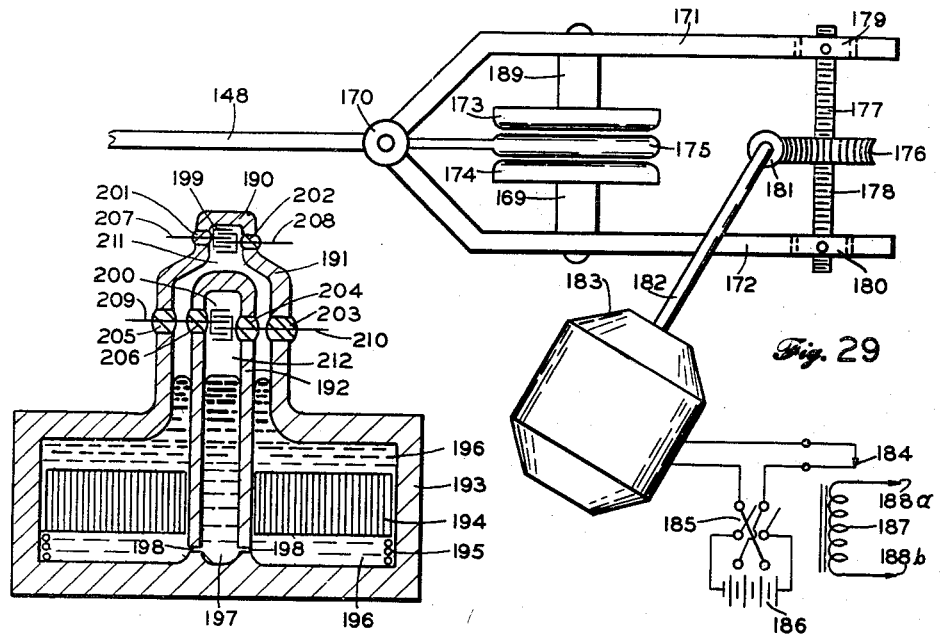
Fig. 29
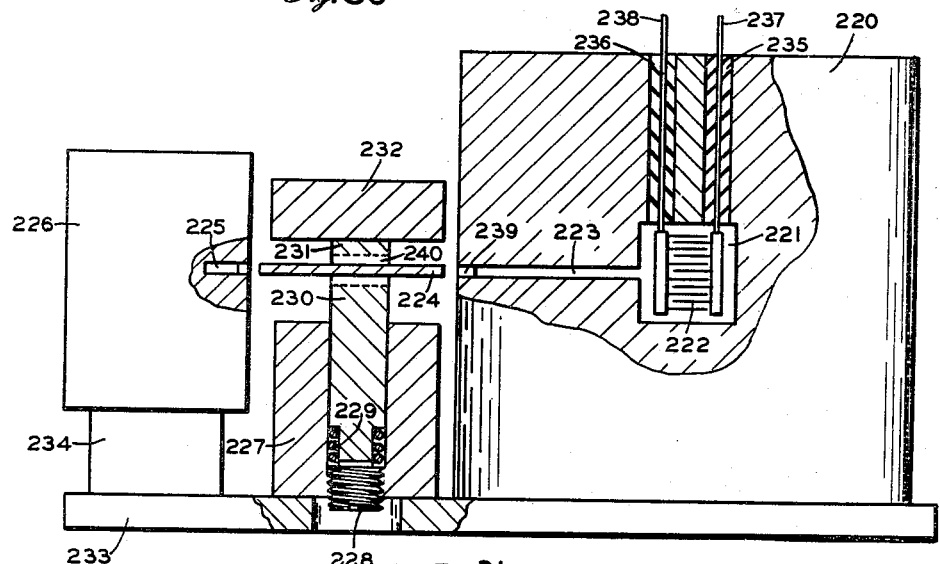
Fig. 30
Fig. 31
INVENTOR.
Glen Peterson

United States Patent Office 2,840,695
Patented June 24, 1958

2,840,695

MEANS FOR TRANSDUCING ELASTIC WAVES

Glen Peterson, Tulsa, Okla.

Application February 20, 1950, Serial No. 145,279

16 Claims. (Cl. 250—17)

This invention relates to a radio geophone as may be required in or used by a system of seismic exploration. More broadly, it is concerned with apparatus and methods which directly produce radio waves when activated by an incident transient or continuous elastic wave displacement such as occurs in the earth when an explosive charge is detonated in a bore hole.

Heretofore, in the art of geophysical prospecting, subterranean geological formations have been mapped by firing an explosive charge at a shot point near the surface of the earth and determining, at one or more points, remote from the shot-point, the time required for the explosion waves to be elastically propagated from the shot point to the points at which the waves are measured. Ordinarily, the elastic waves in the earth are picked up by magnetic types of geophones and, in previous systems, the geophones were connected to the recording vehicle by means of a long multi-conductor cable. At the recording vehicle, the signals were fed to a set of electronic amplifiers and thence to a recorder which furnished an indication of the seismic waves at each geophone station.

It has been recognized that greatly improved results might be obtained if the connecting cables between the geophones and the recording vehicle could be eliminated, as the use of such cables substantially limits the use of the prior art system to relatively accessible and smooth areas. The cable also provides a definite limit to the distance between the recording vehicle and the various geophone stations, as well as limiting the arrangement of geophones about the point of interest.

Some of my recent inventions, disclosed by my copending patent applications Serial Numbers 27,590, dated May 17, 1948; Patent No. 2,557,310, 30,257, dated June 1, 1948; Patent No. 2,494,830, 35,724, dated June 28, 1948; Patent No. 2,700,753, 36,550, dated July 1, 1948, Patent No. 2,599,775; have been directed toward the end of replacing the cable structure, as required by magnetic and other types of geophones, with a system of radio linkages. This having been accomplished, the relative positions of the geophone stations and the recording vehicle are no longer limited by the length of cable, it now being possible to locate the geophones at any point within a radius of several miles from the recording vehicle. This greatly increases the flexibility and usefulness of the prospecting equipment.

Prior to my present invention, my radio-seismic systems have suffered from one serious defect. The transmitters have all been of the continuous-wave, modulated type and so have been undersirably large and bulky. This has been brought about partly by the fact that continuous-wave transmitters are not usually economical consumers of power—especially when the intelligence to be transmitted is of a transient nature, and also by the fact that the modulation process requires a high gain amplifier between the geophone and the transmitter.

This limitation at the point of transmission, is not shared by the cable-connected permanent magnet type geophone; indeed, this geophone requires no standby power, the energy required to transmit the signal being supplied by the ground motion. A simple calculation will show that while the motion of the ground for each seismic impulse is minute such a large mass of ground is in motion that a considerable energy is momentarily available during the short intervals of seismic wave incidence. With these facts in mind, I sought a true radio geophone which had all the advantages of the permanent magnet geophone but which produced pulses of radio frequency energy rather than transients of very low frequency content.

While investigating the problem of dynamic condensers as used in the art of electrometry, I observed that relatively large energies could be released in an electric circuit through the relatively small motion of charged condenser plates providing the initial separation of the plates was as small as mechanically feasible and the electrostatic bias of the plates as large as their separation would support. This led me to speculate upon the possibility of releasing into space the energy stored in a mass of moving earth, through the facility of charged condenser plates and a coil and antenna connected thereto. While, as will be seen, I started out with an incomplete principle, the mechanical embodiment of this principle fortuitously produced the desired result.

An object of my invention is to convert as directly as possible a portion of the energy of motion of a seismically disturbed earth into radio frequency energy and to radiate the same from an antenna.

A second object of my invention is to release from a battery, or other suitable storage device, under the control of an incident seismic disturbance additional energy which likewise is converted as directly as possible into radio frequency energy and radiated from a suitable antenna.

A third object of my invention is to provide a radio geophone which consumes and radiates appreciable power only when elastic waves are incident upon it.

These and further objects and advantages and novel features of my invention will become apparent from the following detailed description taken with the appended drawings, in which:

Figure 11 is a graph of current vs. voltage in an electric discharge through a gas, with strength of the initiating ionization agency as parameter.

Figure 12 is a graph of current vs. potential gradient in an electric discharge through a gas.

Figure 13 is a simplified schematic diagram used in explaining the operation of a dynamic spark gap.

Figure 14 is a graph of the product of gas pressure and gap spacing vs. voltage for breakdown.

Figure 15 is a graph of some of the radio-frequency transients produced in the circuit by a gas discharge.

Figure 16 is a schematic circuit diagram of the low-frequency circuit when a choke coil is used as the ballast impedance element.

Figure 17 is a schematic circuit diagram of a single-ended radio geophone circuit employing a spark gap.

Figure 18 is a schematic circuit diagram of a crystal-controlled radio geophone circuit.

Figure 19 is a scematic circuit diagram of still another form of radio geophone circuit which makes use of a dynamic spark gap.

Figure 20 is a schematic circuit diagram of a radio geophone which uses a large inductance loop as both tank inductance and radiating element.

Figure 23 is an elevation of the mechanical structure of a third form of dynamic spark gap radio geophone, being the experimental form employed in early tests of the system.

Figure 24 is a plan view of the structure of Figure 23.

Figure 25 is a schematic circuit diagram of an amplifier driven radio geophone circuit.

Figure 26 is a schematic circuit diagram illustrating the use of magnetic levitation, and showing also a balanced dipole antenna tapped on the primary radio frequency circuit.

Figure 27 is a partial schematic circuit diagram illustrating periodic levitation.

Figure 28 is a schematic circuit diagram of a spark transmitter being driven by a geophone through an amplifier.

Figure 29 is a schematic drawing of a continuously adjustable dynamic spark gap.

Figure 30 is a schematic drawing of a pressure variant dynamic spark gap.

Figure 31 is a schematic drawing of a radiant energy actuated dynamic spark gap.

Figures 1, 2:
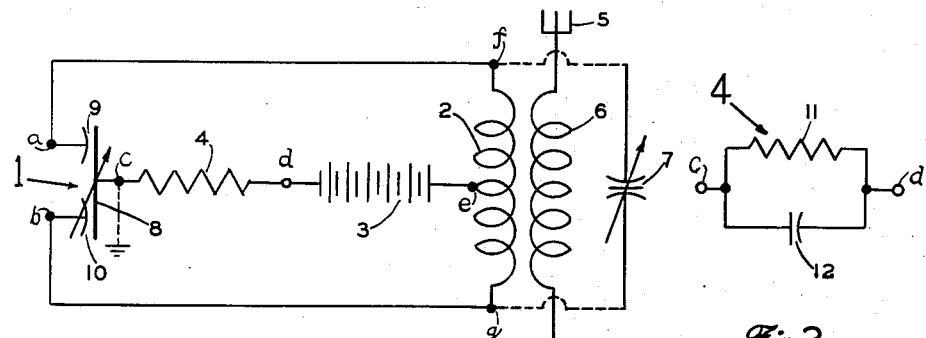
Figure 1 is a schematic diagram of the preferred form of radio geophone circuit.
Figure 2 is a schematic diagram of the preferred form of ballast impedance used in the radio geophone circuit.
Figure 3:
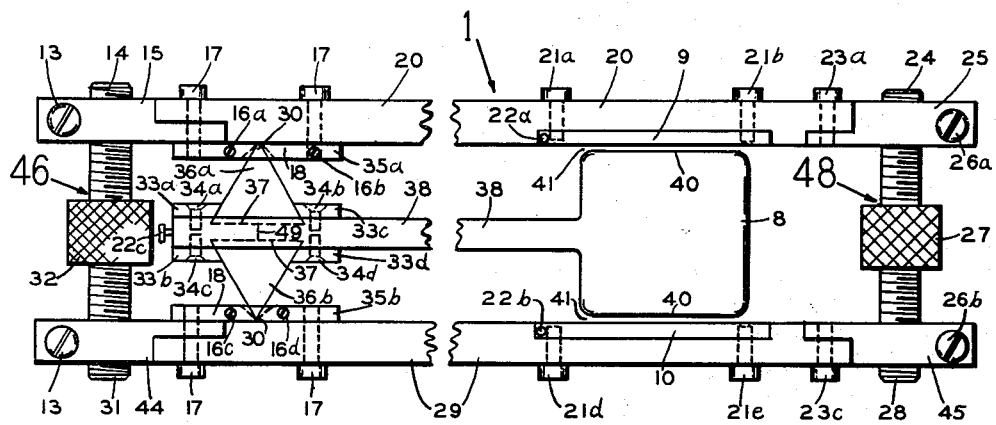
Figure 3 is a side elevation showing the mechanical construction of the preferred form of shock excited dynamic spark gap.
Figures 4, 5:
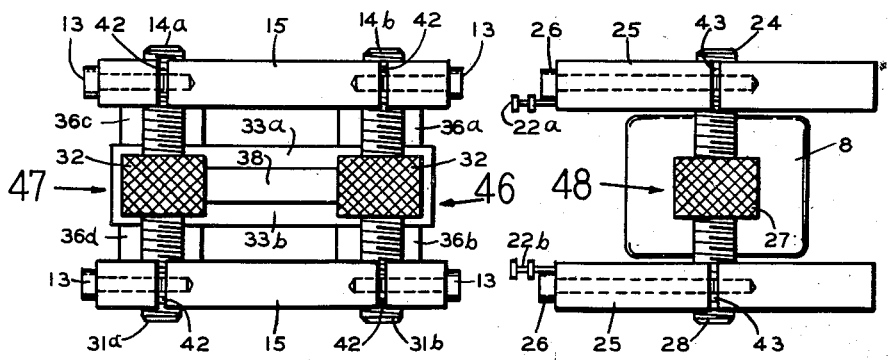
Figure 4 is the left-end elevation of the structure of Figure 3.
Figure 5 is the right-end elevation of the same structure.
Figure 6:
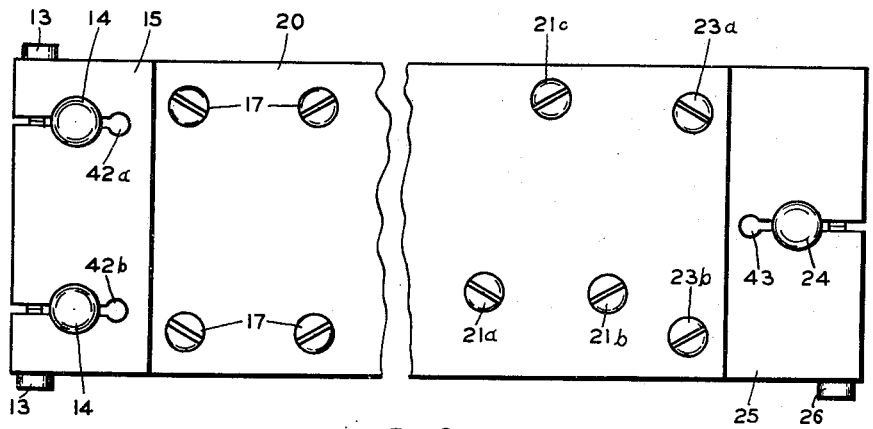
Figure 6 is a plan view of the shock-excited dynamic spark gap.
Figures 8, 9, 10:
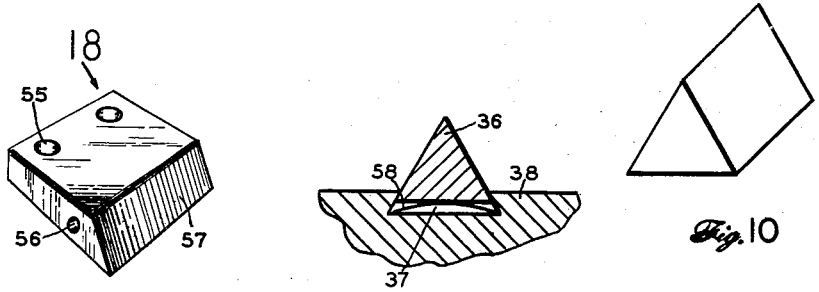
Figure 8 is a detail of the wedging block used in the foregoing structure.
Figure 9 is a detail showing the spring suspension of the insulating wedge in the above structure.
Figure 10 is a detail of the insulating wedge.

My initial idea was, as already noted, to use a push-pull type of dynamic condenser in a circuit such as that of Fig. 1. Therein 1 is the push-pull or differential type of dynamic condenser composed of stator plates 9 and 10 rigidly fastened to but insulated from a supporting structure, shown in Fig. 3, and 8 is the movable condenser plate elastically mounted to the same supporting structure but having sufficient mass as to be adequately coupled to the earth's gravitational field. The preferred arrangement is such that when 9 moves toward 8, 10 moves away from 8 by like amount, it being considered that 8 is stationary in the earth's gravitational field. This type of action can readily be accommodated by a structure wherein 9 and 10 are flat plates, as shown by Fig. 3, and suspended between them is the third plate or electrode 8. If these condenser plates are given a potential difference, as by battery 3, so that an intense electrostatic field exists between them, the motion of these plates relatively to each other, as described above, will cause an alternating current to flow in the circuit composed of radio frequency coil 2 and dynamic condenser 1. In my first model, the condenser plates were made as flat and smooth as possible and their separation set at about .0005 inch. With this arrangement, if care was taken to properly round the edges of the condenser plates, a potential difference of 300 or 400 volts could be maintained between them, with air at atmospheric pressure serving as the dielectric.

With plates 2.250 inches in diameter, separated and charged as above, a motion of .000001 inch will release a pulse of 36 microwatts into the radio-frequency circuit composed of 1 and 2, as already described, and antenna 5 in series with secondary coil 6, the latter being inductively coupled to primary coil 2. An auxiliary tuning condenser 7 may be used if desired but it is sufficient to resonate the circuit with the series capacity of 1 since this capacity is fixed by the effective separation of 9 and 10 and remains constant throughout their motion relatively to 8. An impedance 4 which is preferably a resistance 11 in parallel with a capacity 12, as shown in Fig. 2, may be provided in the central arm between condenser plate 8 and battery 3, as shown. The purpose of this resistor initially was to act as a protective load in the event the condenser plates happened to short together. It will be noted later that this resistor, or in the more general case, the ballast impedance serves a more useful and fundamental purpose.

My original conception was that if the differential capacity change in 1 was both sudden and large, and of a transient character, the energy released into the radio-frequency circuit a, c, b, g, f, a, Fig. 1, might be dissipated as a radio-frequency wave, a portion of which would be radiated from antenna 5. Thus, if the apparatus were placed in intimate contact with a seismically disturbed earth, radio frequency pulses would be radiated from antenna 5 for each incident seismic pulse. Indeed, this proved to be the case when the apparatus was tested experimentally; radio frequency energy was created and radiated when the dynamic condenser was actuated; but the energy thus radiated was considerably in excess of that calculated above. It turned out, upon further investigation, that the required sudden and large capacity change was obtained by the condenser plates moving sufficiently close to partially break down the air dielectric separating them. Thus, what was designed to be a dynamic condenser became a highly quenched dynamic spark gap. Yet in these old-fashioned but rather well-fitting clothes, the arrangement was just as satisfactory as the initial conception, if not more so; accordingly, the remaining portions of this disclosure will be written in terms of this later and probably correct conception. Nevertheless, the apparatus as initially conceived, constructed and tested worked so that no matter what the appropriate explanation may be, this invention must be taken in its broadest original mechanical terms. By means of the apparatus and circuit described, a seismic impulse was for the first time directly converted into a radio wave.

It is a well-known fact that a multiplicity of short spark gaps in parallel are as efficient in producing high power radio frequency transients as a single long spark gap; moreover, such a multiplicity of short spark gaps quench much more rapidly than a single long gap; i. e., the spark dies out more rapidly so that the primary circuit isn't loaded an unnecessarily long time—a condition which greatly increases the effectiveness of the radio frequency currents generated. Wien, I believe, was the first to make use of this principle and before the advent of the thermionic vacuum tube, considerable use was made of the quenched spark gap in radio telegraphy.

The preferred form of my radio geophone may be said to employ two high capacity spark gaps which are differentially connected and which have moving electrodes. However this may be, these gaps work without there being any visible evidence of sparking; i. e., without the emission of light and at potential differences across the plates as low as .01 volt. Too, when the potential difference across the plates is raised to the point where visible sparks occur, the production of the radio frequency transients is only slightly altered. Yet it seems very certain that a conduction process is required, for when thin insulating strips, such as onion skin paper, are inserted between the plates the radio frequency transients are no longer produced.

While I have demonstrated that single-ended circuits, as illustrated schematically by Fig. 17, work satisfactorily under some conditions, the balanced or push-pull circuit is preferred. Using the balance circuit, ground displacements as small as $10^{-7}$ inches will produce radio waves which can be picked up at a considerable distance.

Referring now to Figures 1, 2 and 3 for a detailed discussion, suppose that initially the dynamic gap plates are adjusted so that 8 and 9 have the same separation as 8 and 10. Let the battery 3 voltage be adjusted so that the condenser gaps are on the threshold of conduction, or a little beyond. This adjustment is not critical since the two gaps are equal and current flowing across both simultaneously cancels in the inductance 2. In fact, a good way to adjust the gap plates is to set them so that the radio-frequency output is substantially zero when the plates are not in motion and the battery 3 voltage is a little greater than break-down.

With the dynamic gap adjusted as above, suppose that plates 9 and 10 acting as one mass are set in relative motion with plate 8 acting as another mass, then as first the gap 8, 9 is shorter, and then the gap 8, 10—the conduction across the differentially connected gaps is no longer equal and the radio frequency currents generated in inductance 2 no longer cancel. Under these conditions energy is periodically radiated from the antenna 5, the periodicity being determined by the driving force which unbalances the spark gap.

When the initial separation of the gap plates is of the order of .0005 inch or less, it can be seen that the instrument is sensitive to unbalances considerably smaller than this—perhaps as small as $10^{-8}$ inches. How sensitive the differentially connected dynamic spark gap is to small motions of course depends upon how accurately the initial balance can be made. This, in turn, depends upon the flatness of the plates and how nearly they can be kept in parallel alignment. To put it another way, best results can be obtained when the motion is always perpendicular to the plate faces at all points, and not in the least bit skew; i. e., when the desired motion is at every point along a line of electric force. Under these conditions, the conduction will be uniform and point breakdowns will not occur. Moreover, the energy change is greatest for motion along a line of force.

The exact functioning of ballast impedance element 4, composed preferably of resistance 11 and capacitor 12, can now be explained. When conduction takes place across a gap, 12 is charged to the potential of the battery 3. During the interval when there is no conduction across a gap, 12 is discharged through 11. Thus the time constant of 11 and 12 should for best results be sufficiently small compared with the periodicity of the gap plates that 12 always has sufficient time to become substantially discharged in the interval when there is no conduction across a gap.

In addition to the functions already disclosed, the resistance 11 serves at least two other important purposes. Should one or both of the gaps draw more charge than 12 can hold, the difference must be supplied through 11; consequently, an IR drop is built up across 11 which effectively lowers the potential across the gap plates and so greatly assists in the quenching process. Too, and perhaps this is the most important point of all, the resistance 11 so balances the potentials that there is always available a means of drawing unbalance current through one of the gaps.

Let us suppose that in a stationary position both gaps are drawing current, the condenser 12 will be charged to the potential of the IR drop across 11, and this will be less than the battery voltage by the amount of the drop across both gaps in parallel. If one gap suddenly becomes slightly smaller while the other gets larger by a like amount, the total resistance and hence the IR drop across the gaps in parallel must become greater or less than it was, hence there is opportunity for a sudden current flow around the radio-frequency loop, since 12 will take up or lose charge by an amount specified by the change in IR drop across the gaps. The specific requirement for the production of radio frequency transients is that one gap become smaller than the other. Under these conditions, the voltage almost instantly drops to where it will not support a discharge across the longest gap; simultaneously, the discharge builds up across the short gap and a small avalanche occurs.

The criticism might be entered that if the gaps are adjusted sufficiently close to produce a significant response for the smallest seismic displacements, the gap plates will rattle and bang together for the largest displacements. It is a well-known fact that the magnitude of earth displacements in seismograph exploration vary in the ratio of at least 10,000 to 1. The first reflections have a very high energy while the ones arriving from deep zones are near the threshold of seismic unrest which is generally taken at about $10^{-8}$ inches displacement. This difficulty, which is a grave obstacle in the present art of seismic exploration, is of little consequence here. In the first place, if the gap plates are ground very flat and very smooth, the air between them serves as an excellent shock absorbing medium which alone practically prevents metallic contact between the plates. Secondly, once the motion away from the central balance point is sufficient to start an avalanche in one gap, it is of little consequence how much further the plates move. The radio-wave registering the event will have left the antenna and arrived at the receiving point long before the gap plates have had time to bang together. At the same time, the larger displacements will, with the correct gap and circuit design, tend to produce slightly larger responses because the plates will move further before the discharge starts. This feature can be greatly assisted by giving impedance 4 the proper characteristics. If an RC circuit is used for 4, as in Fig. 2, the time constant can be adjusted to be of the same order of magnitude as the period of the incident seismic shock. Again, an inductance may be used for element 4, as shown in Fig. 16. This would tend to hold the current back and delay the action, giving the plates more time in which to move.

Referring to Figures 3, 4, 5, 6, 7, 8, 9 and 10, the construction of the preferred form of dynamic spark gap will be described in detail. As is Figure 1, element 8 is the stationary conducting element having sufficient mass to couple it to the earth's gravitational field so that it will be able to resist the opposing elastic and electrostatic forces. It is suspended like a horizontal pendulum by means of a long flexible arm or cantilever beam 38. Beam 38 and mass 8 may be made in a single piece from one material, or an assemblage of several pieces of different materials may be used. The left hand extremity of arm 38 is clamped between four insulating prisms 36, if a circuit is chosen requiring 8 to be insulated from ground potential. If 8 is grounded, then the supporting prisms may be hard metal pieces having a polished flat face and opposite it and parallel thereto a polished edge. Good materials to be used when it is required that 36 be an insulator are porcelain like ceramics, crystalline $Al_2O_3$ (sapphire) which is nwo commercially available, glass of good quality, quartz, and any other types of hard insulating materials which can readily be ground flat and given a high polish.

Figure 7:
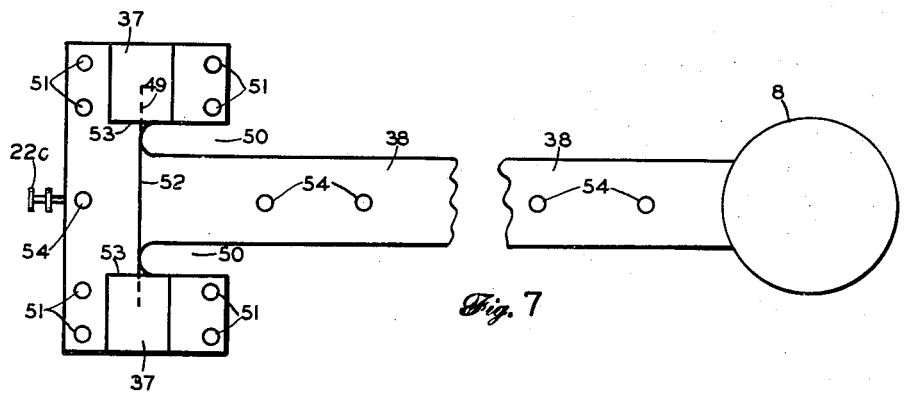
Figure 7 is a detail showing the construction of the cantilever pendulum of the dynamic spark gap.

As particularly shown in Fig. 7, the left hand extremity of the supporting arm 38 is so cut away, and the remaining portions fastened between the insulating prisms 36, that the axis of flexure 49 lies in a plane which passes through the pivot points 30 of the insulating prisms. The purpose of this is to provide proper means for adjusting the separation of 8 and 9, and 8 and 10, so that the axes of adjustment are always in the same plane as the axis of relative motion. In this way, each and every portion of 8, 9 and 10 retain the same angular separation for each position.

The framework of the dynamic gap consists of two rectangularly-shaped insulating pieces 20 and 29 to which are fastened at the ends and by means of screws 17 and 23, four rectangular metallic pieces 15, 25, 44 and 45, These metallic pieces have threaded holes, appropriately positioned, two on one end and one on the other end, into which separators 46, 47 and 48 may be screwed. These separators have right-hand threads $14_a$, $14_b$ and 24 on the top ends, and left-hand threads $31_a$, $31_b$ and 28 on the bottom ends, respectively. The metallic end-pieces 15, 25, 44 and 45 have right and left hand threads corresponding to the separators which mate with them. By means of these separators the separation of the framework and, consequently, of the gap plates 9 and 10, relatively to 8, may be adjusted, both as to the amount of opening and the degree of leveling. The plates 9 and 10, are, as has been inferred, fastened to the insulating frames 20 and 29, respectively, by means of screws 21. During the adjustment, the frames 20 and 29 pivot about the apices 30 of the insulating prisms 36, as previously mentioned. To assist in the leveling process, the prism bases may rest on springs 58 as shown in the detail of Fig. 9, although if the parts are all ground to the requisite degree of flatness, this feature is not essential.

In order to obtain optimum performance, very close gap spacings are essential. This means that the gap plates must be optically flat and move with optical precision. The latter requires that the fulcrums where the insulating-prisms bear must also be precisely ground and lie exactly in the planes of the plate faces. To accomplish this end, the conducting plates 9 and 10 are fastened to their respective insulating frames, 20 and 29, before complete assembly, and these sub-assemblies ground optically flat.

Using the same type of procedure, surfaces of the central electrode and the apices of the insulating prisms while fastened to the arm 38 are likewise ground flat, and to have the same thickness apex to apex as across any portion of 8. This is done in two operations, first for one side and then for the other. To prevent the elasticity of the arm 38 from destroying the flat grinding procedure, through unwanted flexure, holes 54 are provided for temporarily fastening stiffening pieces.

Other parts and their functions in this assembly are the following: Parts 13 and 26 are clamping screws by means of which the separators 46, 47 and 48 are locked in place, once the assembly has been adjusted. To assist in this end, the metallic end pieces 15, 25, 44 and 45 have slots $42_a$, $42_b$ and 43 cut into the screw holes which engage the separators. Parts 16 are screws which fasten end-plates 35 to wedging blocks 18 preventing the prisms from sliding back and forth. The wedging blocks 18 have angular edges 57 so cut that the insulating prisms are not bound on their faces but bear only on their apices. At the same time, the angular extremities of the wedging blocks make grooves for the apices of the wedging blocks. A detail of the wedging block is shown in Fig. 8, and a detail of the insulating prisms is shown in Fig. 10. $22_a$ $22_b$ and $22_c$ are terminal lugs by means of which electrical connections can be made to the plates of the gaps. Parts 27 and 32 are the knurled knobs of the separating screws. Parts 33 are wedging blocks, with acute faces, by means of which the insulating prisms are fastened to the arm 39, using screws 34. 37 is a recess in the arm into which the insulating prisms also fit and where springs 58 can be located if desired.

In all of my experiments thus far, the dynamic gap was operated in air at atmospheric pressure, and this gave satisfactory results. When it is found necessary, certain improvements can be made by operating the gap in other gases than air and at other pressures than atmospheric. This can be accomplished by enclosing the dynamic gap or gaps in a suitable vessel, exhausting the air by means of well-known vacuum technics and admitting the desired amount of a selected gas or combination of gases into the vessel. Procedures for doing all of these things have been well established and won't be further reviewed here.

It is known that some gases give superior results when used in the spark gap. This was learned in the early days of spark telegraphy, and the phenomenon of gaseous conduction has been given much study in recent years. Such devices as the T/R switch in radar sets, ionization chambers for detecting radioactive radiations, Geiger-Müller counters, alternating current rectifier tubes, some types of photo electric tubes, all make use of gaseous conduction, and each requires a very rapid ionization of the gas, and an extremely rapid quenching or de-ionization. The former property is readily obtained in most gases, but the latter is sometimes difficult to obtain. Those particularly interested in this problem are referred to the abundant literature on the subject.

Usually in gaseous discharge devices, it is found that the noble gases at reduced pressures (less than atmospheric) give the best results. Quenching action is often improved, however, by the addition of small amounts of impurities (other gases). These impurities usually act to increase the rate of recombination of ions so that when the ionizing agent is removed, or the electric field reduced below the point of discharge, the ions are quickly removed.

The metals used in the electrode plates of the gap are also known to be extremely influential in starting gaseous discharges. Wien and other early experimenters with the quenched spark gap found silver and copper to be the best materials, but their choice may have been influenced by other factors than the starting of the gaseous discharge; for example, the ability to conduct heat away from the gap. Due to the low powers required to progate radio geophone signals, gap heating will, in general, not be a problem. The two properties most desired in the dynamic spark gap, with which this invention is concerned, are a sudden avalanche of current through the gap, and secondly, a sudden stoppage of gap current.

It is known that all gases are in some state of ionization unless very extraordinary measures are taken to prevent ionization taking place. It is this ionization which is responsible for the conduction of electricity through gases. Ionization of a gas is brought about by the gas atoms or molecules receiving sufficient energy from an external source to cause one or more electrons to escape from the outer orbits of the atom. The external source of energy is usually an incident particle or quantum of radiation. There are at least nine ways in which electrons may be injected into a gas to produce its ionization:

(1) Cosmic rays give rise to high speed electrons which continually bombard all portions of the earth's atmosphere. A considerable thickness of dense material is necessary to keep them out—for example, 50 or 100 ft. of earth.

(2) Radioactive atoms in the process of disintegration eject high speed electrons known as beta rays. Since most substances contain small quantities of radioactive materials, sufficient beta rays are generally present everywhere to start an ionization process.

(3) When metals are heated to sufficiently high temperatures, electrons are ejected from the metallic surface. This is known as thermionic emission, and this property varies considerably for different metals and temperature ranges.

(4) Electrons may also be drawn from metallic surfaces by very high electrostatic fields. This is known as cold emission or sometimes as field emission, and in high voltage gaseous discharges may be the most important agency for starting the discharge.

(5) Electrons are emitted oft times by the bombardment of metallic surfaces by other (usually high speed) electrons. This often acts to increase the number of low-speed or ionizing electrons.

(6) Similarly, electrons may be ejected from a metal surface by positive-ion bombardment. This process usually gives rise to fewer electrons than do incident negative ions.

(7) Again, electrons may be emitted by metastable atoms. These atoms have considerable potential energy, and when such atoms strike a metal surface, all or part of the excess energy may be given to the electrons which are ejected.

(8) Electrons are emitted by metals when the surface is irradiated by light, or when the metals are bombarded by X-rays and $\gamma$-rays. This type of emission is generally known as photo-electric emission.

(9) Electrons are emitted directly from gaseous atoms when the gas is irradiated with hard X-rays or $\gamma$-rays.

One or all of these emission effects may act as the initiating agency of a high state of ionization in the gas of the gap; and in building up the discharge to a high level, many of these effects do undoubtedly enter the process at one time or another.

For a particular gas and metal electrodes, at a given separation, the curves of Fig. 11 show graphically the process of ionic conduction through the gas. As shown, it is customary to divide the discharges into two general types, those which are self-sustaining and those which are not self-sustaining. The mechanism of break-down of a gas is a transition from the non-self-sustaining region (the dark discharge) to the self-sustaining region (the glow, spark or arc). This is brought about by a sudden build up of the ions from all sources as they gather energy while moving under the influence of the applied electric field. Often this build-up and subsequent discharge occurs with explosive violence.

The three curves of Fig. 11 are for three different strengths of initiating agent—for example, three different amounts of $\gamma$-rays. Curve A is for a relatively large irradiation by $\gamma$-rays; curve B is for an intermediate value, and curve C is for a relatively small amount of $\gamma$-radiation. As the voltage is first applied, the conduction in the gas starts out slowly for all three curves, and in this first region obeys Ohm's law. Then as the applied field is increased, all of the ions produced by the ionizing agency tend to be removed; yet the field is still so low that the ions do not gather sufficient energy to produce additional ions by bombardment; and the so-called saturation region is reached in which increases in applied voltage do not cause appreciable increases in current.

Curve C has a well-defined saturation region; curve B a less well-defined region, and curve A scarcely has a true saturation region at all. Such curves are typical for a gas, and while all the regions described exist for each curve, the regions over-lap to a considerable extent and often aren't well-defined.

Beyond the saturation regions for each of the curves, as at $V_a$, $V_b$ and $V_c$, the current through the gas increases exponentially and soon builds up to a high value. This rapid build-up of current in this region of non-self-sustained discharges is often called an electron avalanche, and this term has been used earlier in the present disclosure.

If the applied voltage is raised still further, a self-sustained discharge or spark occurs. Whether the discharge is continuous depends upon the ability of the electric field producing agent to supply the necessary energy. If this ability is sufficient the discharge will be continuous as in a welding arc; if insufficient, one or more sparks will deplete the energy to the point where a discharge is not supported, and the current drops to zero. This is the quenching process already referred to.

Fig. 12 shows a graph similar to those of Fig. 11, except the current through the gap is plotted as a function of the field strength across the gap, in volts per unit distance. Let $E_0$ be the operating point of the differential gap when the electrodes (gap plates) are adjusted to give equal capacities between the central electrode and the electrodes on either side. This operating point is set on the steep portion of the curve as it moves into the self-sustained region, and preferably just below the point where the electron avalanche will carry the current quickly into the sparking or self-sustained region; i. e., at the point where the current increases more rapidly than given by a simple exponential.

As an incident seismic wave impinges on the geophone the outside plates move relatively to the central plate, the field intensity across one gap is raised to $E_1$, while that across the other gap is lowered to $E_2$. The field intensity $E_1$ is sufficiently far toward the self-sustaining region that an electron avalanche occurs and the discharge may move into the self-sustaining area. But it is not essential, although it may be desirable, that the discharge be self-sustaining for a radio-frequency transient to be produced in the associated circuit. The minimum requirement is that an operating point be chosen on the steep portion of the curve in the region of the electron avalanche so that change in current takes place sufficiently rapidly to energize the radio-frequency circuit. This means that a relatively large change in current should occur in a fraction of a half period of the electric oscillation produced.

Fig. 13 shows an electrostatic portion of the circuit under the conditions just discussed. Initially the central plate is at the equilibrium position half-way between the two outer plates. The two capacities are then equal, $C_1=C_2=C_0$. As the upper plate moves toward the central plate, $C_1$ increases and $C_2$ decreases. If $d$ is the initial separation of the gap plates, X the amplitude of the motion, A the effective area of each plate including dielectric constant and other dimensional constants, $Q_1$ and $Q_2$ the respective charges on the condenser plates, and V the battery E. M. F. We can write $$C_1=\frac{A}{d-X}=\frac{Q_1}{V}; C_2=\frac{A}{d+X}=\frac{Q_2}{V} \quad (1)$$

Since the current which flows initially is inappreciable, the drop across the resistance R need not be considered at this point in the analysis. Rewriting Equations 1 in slightly rearranged form, we have $$\left. \begin{array}{l} C_1(d-x)=A=\dfrac{Q_1}{V/(d-x)}=Q_{1/E_1} \\ \\ C_2(d+x)=A=\dfrac{Q_2}{V/(d+x)}=Q_{2/E_2} \end{array} \right\} \quad (2)$$

From this we can get $$Q_1/Q_2=E_1/E_2 \quad (3)$$

It is seen that since the total potential across each gap is fixed by the battery, the charges on the respective gap plates must change in proportion to the changes in electric field intensity. This must mean that some of the charges on the central plate scurry from one side to the other while the charges on the outer plates rearrange themselves by flowing through the radio-frequency coil which is an electrostatic short circuit. Of course some extra charge will be supplied by the battery because the parallel capacity, $C_1+C_2$ is not constant, although the series capacity composed of $$\frac{C_1C_2}{C_1+C_2}$$

is constant throughout the motion.

This readjustment of charges continues as the electron avalanche builds up and eventually results in the spark discharge, as already described. When the current across a gap reaches a sufficient magnitude, an electrostatic analysis is no longer sufficient and the process must be considered from a dynamical point-of-view. Since a complete discharge takes place in only one gap at a time, abundant descriptions of the process may be found in the literature.

It is clear that the materials from which the outer surfaces of the gap plates are made may be very important, and while I have found ordinary materials such as aluminum, copper, silver to be adequate in all of my experiments, my invention shall not be construed as being limited to one material more than another. Similarly, while in my experiments I have found ordinary air to be sufficient as the gas in the gap subsequent study and experimentation will, undoubtedly, uncover gaseous dielectrics which are better. Realizing the possibility of using any and all gaseous elements, compounds and mixtures, my invention is not limited to one gas more than to another. Indeed, I recognize even the possibility of using certain liquids in the gap.

While there are ever-present sufficient ionizing agents, it is clear from the curves of Figures 11 and 12 that the process may be quickened, supplemented, and intensified by the addition of a more potent ionizing agent. Accordingly, I propose placing in the vinicity of the gaps a capsule containing radioactive material. Or such material may be contained as an impurity in or coating on the gap plates. Or again, radioactive impurities of gaseous form may be contained in the gas itself.

Figure 21:
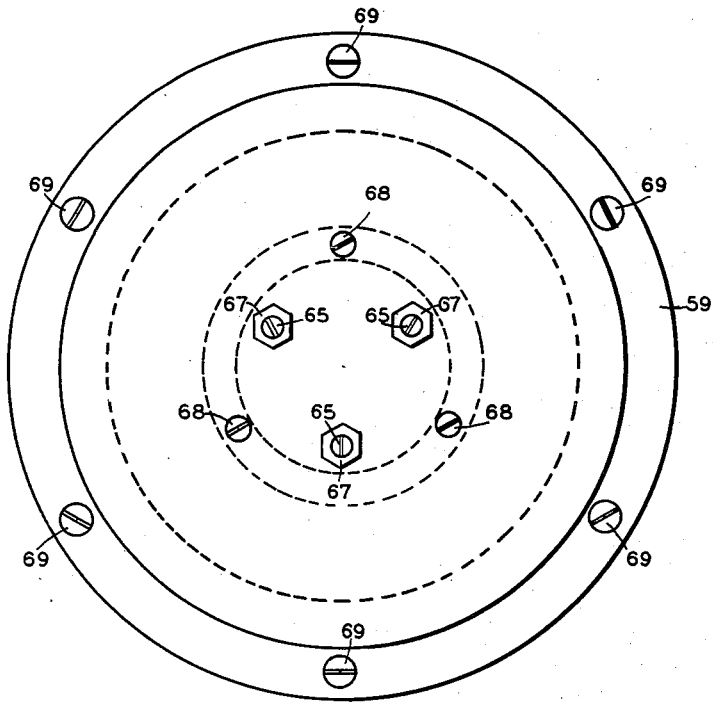
Figure 21 is a plan view of an alternative form of dynamic spark gap.
Figure 22:
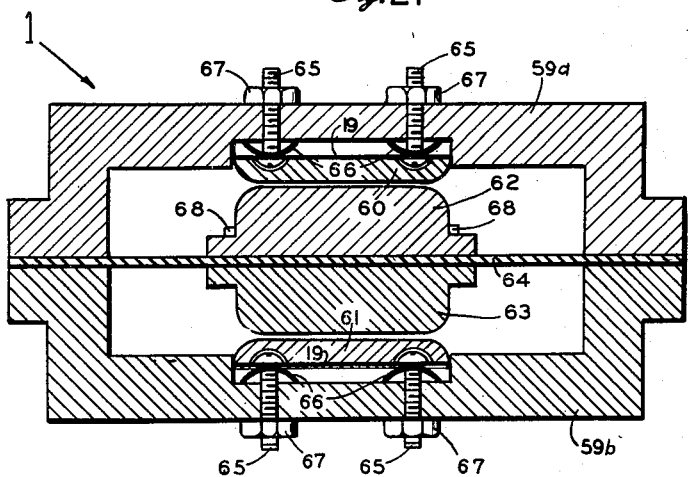
Figure 22 is an elevation in section through the center of the structure of Figure 21.

A second form which the dynamic spark gap may take is shown in Figures 21 and 22. In this structure, the central electrode plates 62 and 63 are mounted on a diaphragm 64, the latter being supported between two insulating cylindrical half-shells $59_a$ and $59_b$. Also supported by the insulating half-shells are the external gap plates 60 and 61. These plates are aligned axially with the internal plates 62 and 63 and each pair of opposing plate faces are parallel to each other. In construction, all plate faces are ground optically flat. Three screws 65 are then used in conjunction with cup springs 66 to mount the external gap plates to the insulating half-shells, the mounting holes in the half-shells being threaded. These screws have sockets in the external electrodes 60 and 61 and are held thereto by means of plates 19 so that positioning and leveling of the external plates may be readily accomplished. Plates 19 are, in turn, fastened to electrodes 60 and 61 by means of screws (not shown) or some other suitable fastening arrangement. Locking nuts 67 are then used to fix these positions. Three screws are used for each plate 60, 61, because three points determine a plane.

This dynamic spark gap may be used in the same circuit as the structure already disclosed, namely the circuit of Fig. 1. In conjunction with this circuit, or a similar one, it forms a true radio geophone. This structure has the advantage of being more compact, readily adjustable and economic to manufacture.

As before, it is proposed to use all types of electrode surfaces, gaseous dielectrics, and if necessary, to include radioactive material to act as ionizing agents.

Figure 16 shows schematically the low-frequency circuit when a large inductance 70 is used as element 4 in Fig. 1. In this circuit 71 is the resistance of the choke coil 70, including any additional resistance that may be added. 3 is the internal, and 9 and 10 the external gap plates, as before; also 3 is the storage battery as previously noted. It is seen in this low-frequency circuit that the gap plates form two capacities which act in parallel. The inductance 70 acting in conjunction with the capacity 9, 10 and the resistance 71, may have such a value as to give this low frequency circuit any desired response. For example it may have such a value as to resonate with the initial capacity of 9, 10 at the frequency of the fundamental component of the mechanical motion. This will tend to build-up the low-frequency voltage across the condenser before discharge takes place, and to retard the radio-frequency discharge.

Fig. 17 shows a single-ended form of radio-geophone circuit which is useful in many applications. 72 is the dynamic single-ended spark gap which may take the mechanical form of essentially half of either of the structure of Figures 3, 22 and 23. 73 is the buffer resistance, 74 the battery, 75 and 76 the primary and secondary respectively, of the radio frequency circuit, 77 a variable capacity used to tune 76, 75 being tuned by 72. 79 is the antenna and 78 is the condenser by-passing the battery 74 and resistor 73. As element 73, a low-frequency and/or a high frequency choke coil may also be used.

Figure 18 shows the circuit of Fig. 1 incorporating a piezo-electric frequency control crystal 80 in the secondary. Alternatively, the crystal may also be placed in the primary in the position of condenser 7. This circuit also shows the antenna coupled to the secondary in a slightly different manner.

Figure 19 shows a dynamic spark gap 84 in a typical spark-coil transmitting circuit. 81 is the low-frequency generator, 82 is a step-up high voltage transformer which at or near the peaks of the low-frequency cycles produces sufficient voltage to break gap 84 down, thus discharging condenser 83 through radio frequency inductance 85, 83 having been charged earlier in the low-frequency cycle. In this way, a radio frequency transient of considerable energy may be formed; a portion of this energy is absorbed by the secondary coil 86, which is coupled to 85 and tuned by 87, and radiated into space by antenna 88. As the plates of the dynamic gap move relatively to each other, the gap gets shorter or longer as the case may be, and at a given voltage from the generator 81, breaks down earlier or later in the low-frequency cycle. At the receiving end, a synchronous detector is used to demodulate the signal, the unaltered low-frequency decremented signal having been transmitted by a second circuit which has a fixed spark gap. Or, alternatively, the differential spark gap may be used to transmit simultaneously two radio-frequency transients, one of which is advanced in time by the short gap, the other of which is retarded in time by the long gap. These two signals may then be compared in a synchronous detector. Or they may be picked up by the same receiver and the beat note between the two amplified and then detected. Many possibilities exist for this circuit.

Fig. 20 shows schematically a circuit of the form of Fig. 1. The essential difference is that the primary coil in the form of a large loop 89 also forms the radiating circuit. Such an arrangement at low radio frequencies does away with the need for a long antenna and so greatly assists in forming a compact unit. At the same time, the loop radiator is directional and this fact may be used to advantage in peaking the energy in the desired direction.

The manner in which conduction takes place in a gaseous spark gap being of further importance to this invention, the accepted theory of such conduction will now be more thoroughly reviewed. As previously stated, the initiating agencies of ionization are radioactive radiations, cosmic rays, X-rays, light, heat and even intense electric fields. The absorption of energy from one or all of these agencies, through an appropriate physical mechanism, caused the molecules or atoms of the gas to gain or lose an electron, and so to lose or gain a negative electrostatic charge. This initiates the process, and the problem of this invention is to account for the rapid accumulation of ionization, under appropriate circumstances, that the best possible use might be made of it in causing radio waves to be released by incident seismic impulses.

Actual conduction through the gas takes place, as is well known, by the movement of the gaseous ions under the influence of the applied electric field. Assuming that additional ionization is caused by elastic collisions between the primary ions and other atoms and molecules. It has been shown by Townsend and others that the first part of the exponential rise of current, experimentally found in a uniform electric field, is adequately described by the relation $$i = i_0 e^{\alpha d} \qquad (4)$$

where $i_0$ is the saturation current density (value of current per unit area in the horizontal part of the curve; i. e., the amount produced by the initiating agencies;) $\alpha$ is the number of new pairs of ions formed per cm. of path of the ions; $d$ is the separation of the parallel electrode plates.

The above relation assumes that all initiating ions start from one of the electrodes, as would be the case in a photo tube. If the original ions do not all start from one plate, as likely is the case in a spark gap, but are distributed uniformly through the gas between the plates, it can be shown that $$i = i_0 \frac{e^{\alpha d}-1}{\alpha d} \quad (5)$$

In both of these expressions it has been assumed that all ionization has been produced by negative ions (electrons). This probably is a valid assumption in most practical cases.

Experimentally, it has been found that ionization, as the field strength is further increased beyond the first Townsend region, increases more rapidly than can be accounted by Equation 4. It was first postulated by Townsend that this was due to additional ionization by collision of positive ions and he derived the expression $$i = i_0 \frac{(\alpha-\beta)e^{(\alpha-\beta)d}}{\alpha - \beta e^{(\alpha-\beta)d}} \quad (6)$$

Where $\alpha$ is the number of new negative and $\beta$ the number of new positive ions produced per cm. of path. This equation fits the experimental results remarkably well. Question was raised at that time, and it has been pretty well established since on the basis of modern theory, that the probability of collision by heavy positive ions is far too low to permit accounting for the process in this way. Accordingly, an alternate physical process was sought. One such, earlier mentioned in this disclosure, is the production of addition ionization at the cathode by the impact of positive ions. This results in an equation of essentially the same form as (6), namely:

$$i = i_0 \frac{e^{\alpha d}}{1 - \gamma(e^{\alpha d}-1)} \quad (7)$$

where similar symbols represent the same quantities as before, and $\gamma$ is the number of additional electrons freed at the cathode per positive ion bombardment of this cathode. The constants $\alpha$ and $\gamma$ are frequently referred to as the first and second Townsend coefficients, respectively; while one can make either of the Expressions 6 and 7 fit the experimental data equally well, auxiliary data, as already noted, supports the latter.

Since the mean-free-paths of ions is inversely proportional to the pressure, the ionization-coefficients used in Equations 4, 5, 6 and 7 may be expressed by equations of the form $$\alpha/P = f\left(\frac{E}{P}\right) \quad (8)$$

$$\beta/P = g\left(\frac{E}{P}\right) \quad (9)$$

$$\gamma/P = h\left(\frac{E}{P}\right) \quad (10)$$

where P is the gas pressure, and E is the applied field.

Townsend found that when the ratio of the ionization-coefficient $\alpha$ to pressure is plotted as a function of $E/P$ for a wide range of pressure P and field E, that a smooth curve resulted. This indicates the validity of Equation 8 and shows that all the factors involved are accounted for by this equation. A theoretical form for the function $f(E/P)$ was developed and is still useful when approximate results are sought. His relation was $$\alpha/P = Ae^{-\frac{B}{E/P}} \quad (11)$$

where A and B are constants for different gases, and the other quantities are as given previously.

With this much background, an analytical expression may be found for the sparking potential in a uniform field. Considering secondary emission of electrons at the cathode as the most appropriate cause of the steep rise in current, it can be shown that the sparking potential $$V_s = \frac{BPd}{ln\left(\frac{APd}{ln(1/\gamma)}\right)} \quad (12)$$

It is seen that the sparking potential is a function of the product of pressure and gap length alone. This fact was discovered experimentally by Paschen as early as 1889, and is often referred to as Paschen's law. Of course, it is not inferred that $V_s$ is necessarily a linear function of $Pd$, although it has been found linear in some regions.

Equation 12 and the physical facts supporting it are very important to this invention. It is clear that the moment of sparking is controlled by the constants A and B for the gas (i. e., the physical properties of the gas), the applied electric field $V_s$ the gap length $d$ and the pressure of the gas P. All of these conditions have to be met in such a relation as (12). If they are so met, then the spark will occur; if they aren't met a spark won't be produced. Thus, the dynamic spark gap may be constructed to be a wholly reliable device, and while the variation of gap spacing is of primary concern, the other factors may be applied to obtain or assist in controlling the operation.

One thing of importance which immediately comes out of the foregoing relations is that the sparking voltage has a minimum value at a critical value of $Pd$. Perhaps this is best shown by Fig. 14. From this figure, the following table of sparking potential and gap spacings for air at atmospheric pressure may be obtained.

*Sparking potential of air, at atmospheric pressure, in the vicinity of the minimum*

| Sparking Potential (Volts) | Gap Spacing | |
|---|---|---|
| | (mm.) | (inches) |
| 700 | .0036 | .00014 |
| 400 | .0063 | .000245 |
| 390 | .0071 | .00028 |
| 380 | .0108 | .00042 |
| 390 | .0180 | .0007 |
| 400 | .0231 | .00091 |
| 420 | .0288 | .00112 |

It is clear that for best results, at low voltages, the operating point of the dynamic gap should be right of the minimum a considerable distance. This means that if one is working with gap spacings of the order of .0001 inch or less, it will be necessary to maintain the gas in the gap at 25 or 30 atmospheres if moderate voltages are used.

The Relation 12 also shows that it is immaterial whether the gap spacing, pressure, or both, are changed to initiate the discharge. In my radio geophone wherein large flat gap plates are used at very close spacings, both the gas pressure and the gap spacing tend to change simultaneously, but in a compensating direction. This is due to the fact, that at the moment of impact, the air is semi-confined and so is compressed by the plate motion. This means that for best results the natural periods of the gap plates should be less than the relaxation time of the compressed gas so that the gas has a certain opportunity to break down. Or it might turn out that break-down in the differential gap actually occurs in the gap for which the spacing is increasing.

Be these conditions as they may, the break-down characteristic is essentially logarithmic, while the $Pd$ compensation, afore described, will be essentially linear; consequently, an opportunity is always had for break-down.

If one operates the gap with fairly high voltages, it may be possible to operate left of the minimum break-down voltage, Fig. 14. Particularly would this be true if some agent other than gap width is the controlling factor, as in the structure of Fig. 31. In this region, left of the minimum, there is a rapid change of break-down voltage for a small change of $Pd$ in a direction of negative slope. Thus, if the biasing voltage is constant, $Pd$ must increase to cause break-down, so that break-down would occur definitely when a gap was opening. The difficulty here, however, is that break-down paths are not necessarily confined to the shortest distances, hence the requirement for the controlling agent being other than gap spacing. For a given gap spacing, in this region, a break-down path of the right length and voltage gradient could invariably be found at least around the edges. Thus, the device would tend to be unstable in this region, unless control was maintained by other means.

Figures 23 and 24 illustrate the early experimental form of my invention—a form suitable to carrying out the several different aspects of my direct radio geophone system. In principle it incorporates all o fthe features heretofore mentioned and in addition several others. The framework consists of two flat plates 102 and 121 between which the cantilever pendulum 103 is supported by means of insulating bushings 127. This pendulum supports the central gap plates 8, and to permit the auxiliary features, about to be mentioned, is constructed of a magnetic type of steel alloy which at the same time has the quality of good spring steel. It has a thin portion 125, on the clamped end and a thick heavy portion 101 on the free end, to give it the desired periodicity of motion. Obviously 125 can be made as thin as desired and 101 can be made as heavy as required—even to the use of different kinds of materials in these portions. The external gap plates 9 and 10 are made adjustable by means of screw stems 104 which support them from arms 105. The latter are supported from the main framework by means of insulating pillars 109 and screws 108. 107 is a gap in each arm for locking nuts 106. It is seen that if the plate faces are all ground flat and parallel, very small gap spacings can be obtained by means of the adjusting screws. Parts 95 and 96 form an assembly of steel laminations which in conjunction with 103 and magnetic gaps 116 and 117 form two magnetic circuits having the pendulum arm 103 common. Coil 119 wound on form 120 around 103 provides the means by which the magnetic system is energized. A permanent magnet 115 across the working gap 116 gives the magnetic system a polarity. This magnet is held in place in the circular slots provided in the two frame members, 102 and 121, by means of pole pieces 96. The latter also support one end of the laminated structure as well as providing an iron path between the permanent magnet and the laminations. Slots 99 in the mounting faces 97 of the pole pieces 98 provide a means of adjusting the magnetic gap 116. The radio frequency coil consisting of form 93 and windings $2_a$, $2_b$, $6_a$, and $6_b$, is shown mounted in position on one end of the frame, as also is the tuning condenser 7, the shaft of which, 123, and the rotor plates 124 are visible. Other minor parts and pieces are used to complete the assembly.

Figures 25, 26, 27 and 28 show several ways in which the apparatus of Figures 23 and 24 may be used. In a partially assembled form, it is clear that it may also be used to satisfy the circuits of Figures 1, 2, 16, 17, 18, 19 and 20 in the manner previously described.

Fig. 25 shows the dynamic spark gap 1 being driven by a magnetic or other type of geophone 140 through an amplifier consisting of transformers 141 and 144, tubes 142 and 146, resistor 143 and battery 145. The driving coil 148 is linked to the secondary of transformer 144 so that the amplified geophone current causes the dynamic gap to go through a set of motions, corresponding to the motions of the geophone, but of much greater amplitude. Obviously, as many stages of amplification may be used with this method as are desired. Other parts of the circuit of Fig. 25 operate as previously explained.

If the horizontal pendulum of Fig. 23 has sufficient weight suspended at its extremity, it is clear that it will sag under the influence of gravity. Now the plates of the spark gap may be adjusted to take this into account, or preferably the pendulum may be magnetically levitated to a neutral position. This may be done simply by making appropriate use of the permanent magnet 115 and adjusting the gaps 116 to balance out the effects of gravity.

Or the levitation may be accomplished as shown in Fig. 26 where a direct current from a battery is fed through the coil 119. The magnitude of this current is adjusted by means of the rheostat 155. Thus, the levitation may be adjusted to a fine degree of balance.

The levitation as used has at least one decided advantage in addition to the mere counter balancing of the forces of gravity. It permits the pendulum to operate as a very sensitive toggle when the distance between the point of application of the levitation and the clamped end is greater than the distance between the free weighted end and the point of application of the levitation. Under some circumstances, this form of operation permits a greatly magnified motion.

An alternative possibility of connecting a balanced dipole antenna consisting of elements 158 and 159, to the primary radio frequency coils 157 and 158 is also illustrated in Fig. 26.

Fig. 27 shows the gap being driven by an alternating current generator, so that sufficient motion is assured to break the gaps down each cycle. Seismic motion of the earth, which likewise couples with the gap plates through direct contact and the action of gravity, would cause the spark break-down earlier or later in the driving cycles as the case may be; i. e., the seismic motion would modulate the regular periodic motion. By comparing the signals transmitted in this way with those transmitted by a gap not coupled to the earth's motion, but which was driven by generator 160, one could observe the action of the incident seismic waves. For example, the two received signals could be applied to a synchronous detector so that when there was no seismic modulation the output from the synchronous detector would be nil. In the presence of seismic modulation, however, the output from the synchronous detector would be the seismic signal.

Fig. 28 shows a more-or-less orthodox fixed spark gap transmitter being driven by a geophone 140 through an amplifier 161 and transformer 162. 163 is the tank condenser which charges up on impulses received through 162, as originally produced in 140 by ground motion, and discharges through the gap 165 thus producing a train of radio frequency waves in 164 and 166, and radiated from antenna 168. 167 is the secondary tuning condenser.

One of the problems in exploration seismology, earlier mentioned, is that of the enormous range in amplitudes covered by the waves incident on the geophone—something like 10,000 or 20,000 to 1. The ground roll and sometimes also the first reflections produce displacements at the geophone of the order of $10^{-3}$ to $10^{-4}$ inches. While the smallest displacements which must produce recordable signals are of the order of $10^{-7}$ to $10^{-8}$ inches. It was pointed out that the gas between the dynamic gap blades tends to furnish a natural AVC action due to its tendency to become incompressible in a confined space. It was also stated that the nature of the spark gap discharge is such that it doesn't particularly matter what happens after the seismic impulse has been transmitted. At the same time it may be desirable in some situations to be able to provide automatic displacement compensation (ADC) in the dynamic spark gap. This can readily be done with the mechanism of Fig. 29. The external gap plates 173 and 174 are attached to two hinged arms 171 and 172 by means of insulators 169 and 189. The hinge 170 is attached to the supporting frame member 148, of any particular size and shape that may be desirable, and the internal gap plate 175 is also fixed to 148 at the hinge point so that it will tend to vibrate about the hinge axis. The two arms 171 and 172 are fastened together on the open end by means of right hand threaded shaft 177, left hand threaded shaft 178 worm gear 176, and gimbals 179 and 180 threaded to match the shafts which work into them. 181 is a worm attached to a motor or clock mechanism 183 by means of shaft 182. If an electric motor is used, it will be energized by a battery 186 through a reversing switch 185 and a relay 184.

The relay coil 187 can, in turn be connected, via terminals 188$_a$ and 188$_b$, in the center leg of the radio geophone circuit, i. e., as part of impedance element 4. Or it may be connected to a geophone of the magnetic type. In this way, the first strong seismic waves received close the relay 184 and this starts the motor 183 in such a direction as to bring plates 173 and 174 closer together so that the gap spacing will be made continually smaller, at a predetermined rate, as the incoming seismic signals get weaker. The relay 184 is of the self locking type, or is given a sufficient time constant that it will stay closed several seconds after first closing upon reception of the first strong seismic impulse.

Alternatively, the relay coil 187 may be connected to a receiver and operated remotely. In these several ways, the gap may be made to have an appropriate spacing throughout the interval of the seismic record.

Again, 183 may be a suitable clock mechanism which can be accurately pre-set, or which can be started by a relay or incident shock. In the former case, all geophones can have their clocks adjusted to keep accurately the same time. These clocks can be pre-set with the gap plates at a fairly wide spacing; then at some future time, the gap spacings will be right to receive the seismic pulses and transmit the radio waves. This is possible because of the extremely small gap spacings wanted during the interval of transmission. For example, the gap spacing should change from $10^{-3}$ to $10^{-7}$ inches in five seconds. This is at a linear rate of $10^{-3/5}=.0002$ inch a second, to a very close approximation. Thus, if the clocks are preset a half-hour in advance of the time of the seismic explosion, the initial gap spacing would have to be only $.0002 \times 30 \times 60 = .36$ inch.

Fig. 30 shows an alternative form of radio geophone dynamic gap. It was shown in the theoretical discussion that it is immaterial whether the gap spacing or gas pressure is varied, or both. The present structure is one in which the gaps 199 and 200 are fixed but the gas pressure is caused to vary by an incident displacement. The structure shown is of an involuted form so arranged to provide a differential action, the pressure at one gap being at a crest value while that at the other is in a trough. Of course, one or other of the gaps may be used separately if differential action is not desired.

As illustrated, the device has two gas-filled chambers 211 and 212 of approximately the same volumetric dimensions, and in these the gaps are located. The walled portions 190, 191, 192 and 193 provide the enclosures for the chambers as shown. 194 is a piston of appropriate mass resting on a spring 195. When a seismic wave displaces the vessel relatively to the piston, say by the vessel moving downward, the liquid in the upper and outer chamber 196 is momentarily contracted into a larger space so that the gas pressure in 211 is momentarily decreased. If the gap spacing of 199 and the voltage applied to it, have appropriate values, the gap will suddenly become very conducting and discharge through the radio frequency circuit, such as that of Fig. 1. At the same time, the liquid in the inner chamber 197 will be compressed slightly, the gas pressure in 212 will raise and gap 200 will not discharge. Conversely, as the piston falls, on the second part of the seismic cycle, the compressions, and rarefactions in the respective chambers will be reversed and gap 200 will discharge while 199 doesn't—thus providing the differential action sought when one pair of gap terminals, say 208 and 210, are connected in parallel while the other pair of terminals 207 and 209 are connected to the primary coil of the radiofrequency circuit, as in Fig. 1.

There being no dearth of seismic energy, a piston having a large cross-section may be used, while the gaps may be placed in tubes of very small cross-section. In this way a great amplification may be obtained. For example, if the gaps are in tubes ¼ inch in diameter, while the piston occupies a chamber 4 inches in diameter, the amplification neglecting total gas volume, will be $$\frac{(4)^2}{(¼)^2}=1024$$

At the same time a device of such dimensions is not overly bulky, and it has a very simple construction. The effect of total gas volume in materially decreasing the above amplification is neglected because it is believed that pressure waves will be sent through the gas filled tubes rather than that the whole gas volume will be instantly compressed or rarified. If this is not true, the figure for amplification will depend upon the ratio of total gas volume to change in gas volume.

The method of taking the gap leads through the chamber walls should not be followed too literally; Fig. 30 is intended largely as a schematic mechanical design rather than as a detailed mechanical structure.

A somewhat less efficient pressure sensitive radio geophone may be made by eliminating the liquid from the device of Fig. 30 and making the piston sufficiently thick that very little gas volume exists in the portions of the chamber having a large cross-section. In this way, as before, a small displacement over a large area may be converted into a larger displacement over a smaller area. But here again, the phenomena of pressure waves may me the primary consideration so that volumetric considerations are less important.

If the sudden displacement of the piston, relative to the gas, causes pressure waves to be produced in the gas for the most part, then it might be more effective to use a piston having a concave spherical or parabolic face with the gaps located at the foci of these faces. Particularly would this be true if the gas used in the chamber was very dense, for example krypton or xenon at a hundred or more atmospheres pressure. Sound velocity under these circumstances would be sufficiently great that a reasonably sized piston might have a diameter of half a wave length or greater.

Again the entire chamber space could be filled with a suitable liquid.

Fig. 31 illustrates schematically a dynamic spark gap arrangement in which an incident ionizing radiation is the active agent in determining the time of spark breakdown. The gas-filled chamber 221 is located inside a block of dense matter 220 which substantially shields it from all sources of energy which would cause its ionization. For this purpose the materials out of which the chamber walls, as well as the gas itself and all other materials in energetic contact with the chamber gas, must be exceptionally free of radioactive contaminants which would ionize the gas. Under these conditions it is possible to operate the gap in a suspended or retarded condition so that an unwanted discharge brought on by contaminants which it is impossible to completely remove, occurs only once every few minutes. The action of delayed spark gaps has of course been observed, and the failure of having sufficient ionizing agencies present made some early observations on gas discharges worthless.

Connecting the chamber 221 with the outside is a long narrow canal or corridor or tube 223, perhaps a mill or two wide. This canal is closed by means of a relatively thin plug 239 so that the gas on the inside may be maintained at a pressure other than atmospheric, if such is desirable. Directly opposite the corridor and in accurate alignment with it is a long-thin, dense lamination 224 which is just sufficiently thick to completely block the corridor from external radiations when in a neutral position. This lamination is mounted on a piston 230, the latter being supported in a cylinder block 227 and resting on a spring 229. This spring is held in position within the cylinder block by a threaded plug 228 whose position up-and-down may be accurately determined by rotation so that the initial position of the lamination may be accurately set. Above the lamination 224 the shaft extends, as 231, to support any additional weight 232 which it might be desirable to use, as well as to place the same amount of material in the radiation path above and below the lamination. Slots 240 may be cut in the piston walls directly above and below the lamination, as shown by the dotted lines, so that the radiation path is not unnecessarily impeded above and below the lamination.

To the left of the lamination and in perfect axial alignment with it and the canal to the chamber is a radiation source 225, also appropriately shielded by means of the dense housing 226. The latter is supported on a pedestal 234 from the same platform 233 which supports the cylinder block 227 and the chamber housing and shield 220. Thus, when seismic waves are incident on this assemblage, as when it is in mechanical contact with a seismically disturbed earth, the radiation source 225 and chamber 221 move relatively with respect to the lamination 224, the latter being held momentarily by gravity. As a consequence, a thin pencil of rays from 225 can pass above or below the lamination 224 through the canal 223 and into the chamber 221. If these rays are strong, they will instantly ionize the chamber gas and cause a discharge across the gap 222, it being assumed that the latter is connected in a circuit such as that of Fig. 17 by means of the terminals 237 and 238 which pass into the chamber by means of insulating sleeves 235 and 236. While for convenience the insulating sleeves and inter-connecting wires are shown passing along a straight line path into the chamber, it would be far more efficient to have them take a curved path so that radiation, which follows straight line paths, could not readily leak into the chamber by following the insulating sleeves.

In all seismic exploration operations, a multiplicity of geophones is generally required, and it is desirable to be able to receive signals from each geophone and separately record them on a common chart; accordingly, a means of selecting the signals transmitted, more-or-less simultaneously, by a group of radio geophones, through a common aether, is essential. To this end, several of the incidental features of the radio geophones above described may be applied.

The first of these means is to tune each of the radio frequency circuits to a slightly different frequency and receive the signals by a multi-channel receiver having excellent channel selectivity characteristics. Such a receiving system was described in my pending application Serial No. 35,724.

The second means of providing for geophone signal selection is to assign a particular time of response to the ballast circuit of each radio geophone.

The third means of providing for geophone identification is to provide a frequency of response to the ballast circuit.

A fourth means for providing geophone selection is that of assigning a particular frequency to each of the low-frequency generators used by the modulated spark gap transmitters described in connection with Figure 19.

A fifth means for selecting geophone responses at the receiving end is found in connection with the method of Fig. 27. Namely, that of identifying each geophone by means of the periodicity of the variation of gap thickness. This in turn is accomplished by using low-frequency driving generators of different frequencies.

These and other means well-known to the art of radio communications may be employed to provide for the separation and identification of geophone signals.

I claim:

1. An electromechanical transducer comprised of a spark gap, having one or more movable elements, in circuit arrangement with a radio-frequency tank circuit, a source of electric power and an antenna, said movable elements being responsive to frequencies other than those to which said radio-frequency tank circuit and antenna are responsive, said movable elements being resilient to and actuated by elastic waves, said transducer producing and radiating electromagnetic waves.

2. An electromechanical transducer comprised of a spark gap, having one or more movable elements, in circuit arrangement with a radio-frequency tank circuit, a ballast impedance and an antenna, said movable elements being responsive to frequencies other than those to which said radio-frequency tank circuit and antenna are responsive, said movable elements being resilient to and actuated by elastic waves, said transducer producing and radiating electromagnetic waves.

3. A transducer comprised of a spark gap, having one or more movable elements including a gaseous atmosphere, in circuit arrangement with a radio-frequency tank circuit, a ballast impedance and an antenna, the transducer being actuated by vibratory motion, and ionization of said gaseous atmosphere in the said spark gap being initiated by a source of radiation located nearby.

4. A transducer comprised of a spark gap having one or more optically-flat high-capacity electrodes elastically suspended from and in parallel alignment with one or more fixed optically-flat high-capacity electrodes, the separation of the electrodes forming the gap being generally less than one ten-thousandth of an inch, the elastically suspended gap electrodes being conductively connected to one terminal of a radio-frequency inductance coil, the fixed gap electrodes being conductively connected to a resistance in series with a source of electromotive force and the second terminal of this combination being connected to the second terminal of said radio-frequency inductance coil, said combination of resistance and source of electromotive force being shunted by a capacity, the radio-frequency coil being resonated by the capacity of the spark gap and suitably connected to an antenna.

5. A transducer, as in claim 4, but having capacity in addition to the series capacity of the spark gap connected across said radio frequency inductance coil, said additional capacity being variable so that the resonating frequency of the tank circuit may be adjusted.

6. A spark transmitter of damped electromagnetic waves, directly modulated by sound waves immediately incident thereon, said spark transmitter having at least a condenser, an inductance coil, a battery and a spark gap, said spark gap having at least two insulated electrodes with an ionizable gas there-between, said insulated electrodes and ionizable gas together forming a coupled structure responsive both to electromagnetic and sound waves said modulation being accomplished by variations produced by the incident sound acting on the spark gap.

7. A spark transmitter of damped electromagnetic waves modulated by seismic waves incident thereon, said spark transmitter having at least a condenser, an inductance coil, a battery, an antenna, and a spark gap, said spark gap consisting of at least three elements: two insulated electrodes and an ionizable gas between said electrodes, said three elements together forming an impedance responsive to both electromagnetic and seismic waves said modulation being accomplished by variations produced by the incident seismic waves acting on the spark gap.

8. A spark transmitter of damped electromagnetic waves actuated by elastic waves incident thereon, said spark transmitter comprising an inductance in series connection with a ballast impedance, a source of electromotive force and a spark gap, said spark gap having at least two insulated electrodes with an ionizable gas therebetween, said electrodes and ionizable gas together forming an impedance responsive to both electromagnetic and elastic waves said inductance coil being coupled to an antenna.

9. A spark transmitter of damped electromagnetic waves modulated by seismic waves incident thereon, said spark transmitter comprising an inductance coil in series connection with a ballast impedance, a source of electromotive force and a spark gap, said spark gap having at least two insulated electrodes in a gaseous atmosphere said electrodes and gaseous atmosphere forming a coupled non-linear impedance responsive to both electromagnetic and seismic waves, said modulation being accomplished by variations produced by the incident seismic waves acting on the spark gap, said spark transmitter being mechanically coupled to the earth.

10. Apparatus for turning a spark transmitter of damped electromagnetic waves on and off comprising a spark gap having at least four elements, at least two of said elements being closely spaced electrodes, one of said elements being an ionizable gas maintained at a controlled pressure in the vicinity of said electrodes, another of said elements being an agent for initiating ionization in said gas, said spark gap being connected in circuit arrangement with a radio-frequency tank circuit, a source of electric power and an antenna, at least one of said spark gap elements being responsive to elastic waves and acting to conductively close said spark gap when elastic waves are incident thereon and to open said spark gap when elastic waves are not incident thereon.

11. Apparatus for turning a spark transmitter of damped electromagnetic waves on and off, as in claim 10, said spark gap element responsive to elastic waves being said electrodes, one of said electrodes being elastically suspended relative to the remaining electrodes with the momentary separation of said electrodes controlled by said incident elastic waves.

12. Apparatus for turning a spark transmitter of damped electromagnetic waves on and off, as in claim 10, said spark gap element responsive to elastic waves being said ionizable gas with the momentary pressure controlled by said incident elastic waves.

13. Apparatus for turning a spark transmitter of damped electromagnetic waves on and off, as in claim 10, said spark gap elements responsive to elastic waves being the agent for initiating ionization in said gas position of said agent relative to the remaining spark gap elements being controlled by said incident elastic waves.

14. In combination a receiver of elastic waves and a transmitter of electromagnetic waves, for conveying intelligence comprising a spark gap having at least four elements coupled to an elastic medium and in circuit arrangement with a radio-frequency tank circuit, a source of electromotive force and an antenna, at least two of said elements being closely spaced electrodes, one of said elements being an ionizable gas maintained at a controlled pressure about and between said electrodes, another of said elements being an agent for initiating ionization of said gas, said electrodes being responsive to elastic waves incident thereon, at least one of said electrodes being elastically suspended relative to the remaining electrodes with the momentary spacing between said electrodes controlled by said incident elastic waves, an electromagnetic wave being generated and radiated when said elastic waves are incident upon said combination.

15. In combination a receiver of elastic waves and a transmitter of electromagnetic waves, for conveying intelligence comprising a spark gap having at least four elements coupled to an elastic medium and in circuit arrangement with a radio-frequency tank circuit, a source of electromotive force and an antenna, at least two of said elements being closely spaced electrodes, one of said elements being an ionizable gas maintained at a controlled pressure about and between said electrodes, another of said elements being an agent for initiating ionization of said gas, said ionizable gas being responsive to elastic waves incident thereon with the momentary pressure controlled by said incident elastic waves, an electromagnetic wave being generated and radiated when said elastic waves are incident upon said combination.

16. In combination a receiver of elastic waves and a transmitter of electromagnetic waves, for conveying intelligence comprising a spark gap having at least four elements coupled to an elastic medium and in circuit arrangement with a radio-frequency tank circuit, a source of electromotive force and an antenna, at least two of said elements being closely spaced electrodes, one of said elements being an ionizable gas maintained at a controlled pressure about and between said electrodes, another of said elements being an agent for initiating ionization of said gas, the agent for initiating ionization in said gas being responsive to elastic waves incident thereon, position of said agent relative to the remaining spark gap elements being controlled by said incident elastic waves, an electromagnetic wave being generated and radiated when said elastic waves are incident upon said combination.

References Cited in the file of this patent

UNITED STATES PATENTS

| | | |
|---|---|---|
| 1,088,686 | Ditcham | Mar. 3, 1914 |
| 1,340,963 | Lemmon | May 25, 1920 |
| 1,491,103 | Hoke | Apr. 22, 1924 |
| 1,543,041 | Weaver | June 23, 1925 |
| 1,623,745 | Murray | Apr. 5, 1927 |
| 1,706,066 | Karcher | Mar. 19, 1929 |
| 1,843,725 | Karcher | Feb. 2, 1932 |
| 1,864,214 | Petty | June 21, 1932 |
| 2,008,713 | Hayes | July 23, 1935 |
| 2,118,930 | Lilja | May 31, 1938 |
| 2,121,607 | McIlvaine | June 21, 1938 |
| 2,235,755 | Bakker et al. | Mar. 18, 1941 |
| 2,257,187 | Owen | Sept. 30, 1941 |
| 2,265,513 | Burg | Dec. 9, 1941 |
| 2,316,915 | Truman | Apr. 20, 1943 |
| 2,322,681 | Zenor | June 22, 1943 |
| 2,410,087 | Litton | Oct. 29, 1946 |
| 2,428,297 | Seeley | Sept. 30, 1947 |
| 2,499,155 | O'Neil | Feb. 28, 1950 |
| 2,522,433 | Dahlberg | Sept. 12, 1950 |